United States Patent
Karels et al.

(10) Patent No.: US 8,677,471 B2
(45) Date of Patent: Mar. 18, 2014

(54) PORT ALLOCATION IN A FIREWALL CLUSTER

(75) Inventors: Michael J. Karels, Eden Prairie, MN (US); Michael James Silbersack, Little Canada, MN (US)

(73) Assignee: McAfee, Inc., Santa Clara, CA (US)

( * ) Notice: Subject to any disclaimer, the term of this patent is extended or adjusted under 35 U.S.C. 154(b) by 37 days.

(21) Appl. No.: 13/323,815

(22) Filed: Dec. 12, 2011

(65) Prior Publication Data
US 2013/0152188 A1  Jun. 13, 2013

(51) Int. Cl.
*G06F 9/00* (2006.01)
(52) U.S. Cl.
USPC ............. 726/11; 726/1; 726/2; 726/3; 726/4; 726/5; 726/6; 726/7; 726/8; 726/9; 726/10; 705/79; 713/153; 713/154; 709/238; 709/239; 709/240; 709/241; 709/242; 709/243; 709/244

(58) Field of Classification Search
USPC ......... 726/1–21; 713/150–155, 201; 370/389; 709/238–244
See application file for complete search history.

(56) References Cited

U.S. PATENT DOCUMENTS

| | | | |
|---|---|---|---|
| 7,844,731 B1 * | 11/2010 | Zhou | 709/238 |
| 2002/0143850 A1 * | 10/2002 | Caronni et al. | 709/201 |
| 2009/0144444 A1 * | 6/2009 | Chauffour et al. | 709/238 |

* cited by examiner

*Primary Examiner* — Luu Pham
*Assistant Examiner* — Roderick Tolentino
(74) *Attorney, Agent, or Firm* — Wong, Cabello, Lutsch, Rutherford & Brucculeri, LLP

(57) ABSTRACT

A firewall cluster having three or more firewall processing nodes sharing the same shared IP address. Port numbers are assigned to the firewall processing nodes within the cluster and are used to distinguish between traffic sent to the cluster. Each network connection is assigned a destination port number. Each node receives the network connection and its assigned port number and determines if the assigned destination port number matches one of its assigned port numbers. If so, the node processes the network connection. If the assigned destination port number does not match one of its assigned port numbers, the network connection is discarded.

25 Claims, 4 Drawing Sheets

US 8,677,471 B2

PORT ALLOCATION IN A FIREWALL CLUSTER

FIELD OF THE INVENTION

The invention relates generally to firewall operation, and more specifically in one embodiment to port allocation in a firewall cluster.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Computers are valuable tools in large part for their ability to communicate with other computer systems and retrieve information over computer networks, Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users or pranksters to attempt to communicate with other users' computers in a manner that poses a danger to the other users. For example, a hacker may attempt to log in to a corporate computer to steal, delete, or change information. Computer viruses or Trojan horse programs may be distributed to other computers, or unknowingly downloaded or executed by large numbers of computer users. Further, computer users within an organization such as a corporation may on occasion attempt to perform unauthorized network communications, such as running file sharing programs or transmitting corporate secrets from within the corporation's network to the Internet.

For these and other reasons, many corporations, institutions, and even home users use a network firewall or similar device between their local network and the Internet. The firewall is typically a computerized network device that inspects network traffic that passes through it, permitting passage of desired network traffic based on a set of rules.

Firewalls perform their filtering functions by observing communication packets, such as TCP/IP or other network protocol packets, and examining characteristics such as the source and destination network addresses, what ports are being used, and the state or history of the connection. Some firewalls also examine packets traveling to or from a particular application, or act as a proxy device by processing and forwarding selected network requests between a protected user and external networked computers.

The firewall typically controls the flow of network information by monitoring connections between various ports, sockets, and protocols, such as by examining the network traffic in a firewall. Rules based on socket, port, application, and other information are used to selectively filter or pass data, and to log network activity. Firewall rules are typically configured to identify certain types of network traffic that are to be prohibited or that should have certain other restrictions applied, such as blocking traffic on ports known to be used for file sharing programs while virus scanning any received over a traditional FTP port, blocking certain applications or users from performing some tasks while allowing others to perform such tasks, and blocking traffic based on known attack patterns such as repeated queries to different ports from a common IP address.

But, the ability of a firewall to manage many such connections when distributed across multiple computer systems is limited in that the firewall system must manage which node in the cluster handles each connection. Improved firewall distribution in a cluster is therefore desired.

SUMMARY

In one example embodiment, a firewall cluster comprises three or more firewall processing nodes sharing the same shared IP address. A network connection is assigned to one of the three or more firewall processing nodes in the firewall cluster by sending the data to a destination port on the shared IP address of the firewall cluster assigned to a receiving node of the three or more firewall processing nodes. In a further example, the destination ports are assigned to the three or more nodes in the firewall cluster by round-robin or sequential grouped assignment.

The receiving node receives the assigned network connection and processes the received network connection based on matching the assigned network connection's destination port number to a port number assigned to the receiving node, while other nodes discard the network connection based on the assigned network connection's destination port number not matching a port number assigned to the nodes other than the receiving node.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Figure 1:
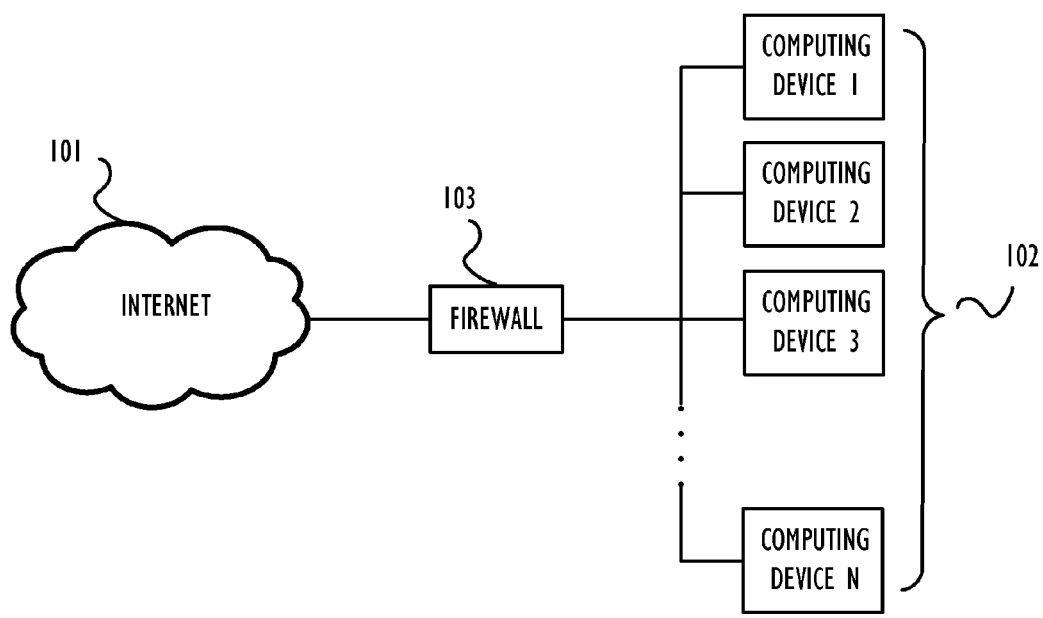
FIG. 1 shows an example network including a firewall, as may be used to practice some embodiments of the invention.

FIG. 1 illustrates a typical computer network environment, including a public network such as the Internet at 101, a private network 102, and a computer network device operable to provide firewall and intrusion protection functions shown at 103. In this particular example, the computer network device 103 is positioned between the Internet and the (private network, and regulates the flow of traffic between the private network and the public network.

The network device 103 is in various embodiments a firewall device, and intrusion protection device, or functions as both. A firewall device or module within the network device provides various network flow control functions, such as inspecting network packets and dropping or rejecting network packets that meet a set of firewall filtering rules. As described previously, firewalls typically perform their filtering functions by observing communication packets, such as TCP/IP or other network protocol packets, and examining characteristics such as the source and destination network addresses, what ports are being used, and the state or history of the connection. Some firewalls also examine packets to determine what application has established the connection, or act as a proxy device by processing and forwarding selected network requests between a protected user and external networked computers. Firewalls often use "signatures" or other characteristics of undesired traffic to detect and block traffic that is deemed harmful or that is otherwise undesired.

Firewalls typically use sets of rules to filter traffic, such that what happens with any particular element of network data is dependent on how the rule set applies to that particular data. For example a rule blocking all traffic to port 6346 will block incoming traffic bound for that port on a server within the protected network, but will not block other data going to the same server on a different port number. Similarly, a rule blocking traffic originating from a file sharing program such as Shareaza will use patterns in the traffic to block Shareaza traffic on port 6346, but allow other traffic on port 6346.

But, in an environment where a firewall is implemented as a system distributed across multiple computers or nodes, such as in a large or complex system, the ability of multiple nodes to share a connection is limited by each node's information regarding the connection, such as socket information, application information, user information, and the like regarding the connection. Some embodiments of the invention therefore provide a mechanism for sharing state information such as user or other such connection data with other systems in a cluster firewall, enabling multiple nodes in the firewall cluster to process the same connection such as to facilitate load balancing or failover of failed nodes. Because only one node handles each connection at one time, sharing information between nodes provides the cluster the ability to load balance by moving connection responsibility between nodes, to manage failure of a node in the cluster by moving its connections to another node, and to perform other such functions.

Figure 2:
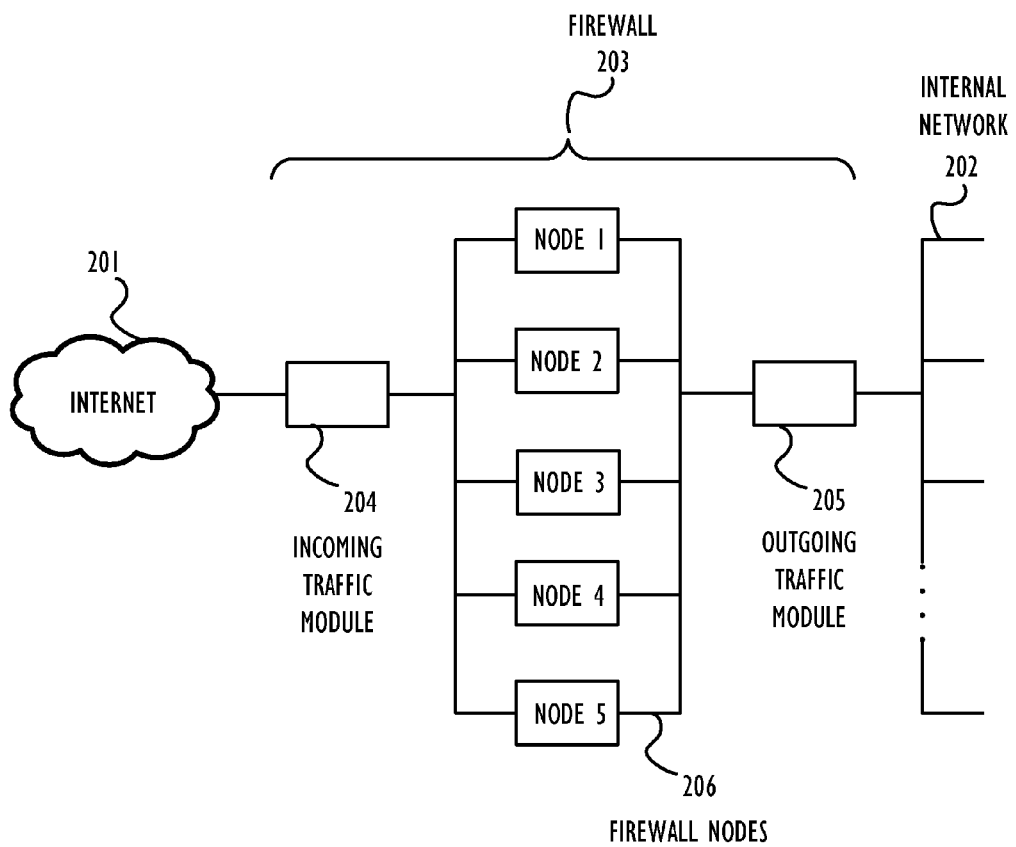
FIG. 2 shows an example network including a firewall cluster comprising multiple firewall nodes, consistent with an example embodiment of the invention.

In one such example, a firewall or intrusion protection system is implemented as a cluster or connected group of nodes that share processing traffic flowing through the firewall. FIG. 2 shows a network with a distributed firewall, as may be used to practice some embodiments of the invention. Here, a network such as the Internet 201 is coupled to an internal network 202 by a firewall, 203. The firewall 203 comprises an incoming traffic module 204 and an outgoing traffic module 205 that can perform functions such as load balancing and other firewall management functions. The firewall or intrusion protection rules are applied in firewall nodes 206, which are connected to one another by network connections as shown.

Here the five nodes shown each comprise a separate computer system running an instance of firewall or related software, operable to apply rules to traffic to selectively permit or block traffic flowing between the Internet 201 and the internal network 202. In an alternate embodiment, some nodes such as nodes 1, 2, and 3 execute a firewall application, while other nodes such as 4 and 5 execute an intrusion protection system (IPS) application. The nodes 204 and 205 are responsible for performing functions such as load balancing traffic routed to the firewall nodes 206, ensuring that the nodes are able to work together efficiently to provide higher throughput capability than a single node.

Some firewall embodiments share the load of applying firewall rules by assigning each connection to a different port number in the firewall using load balancing nodes 204 and 205, and in further embodiments may use multiple IP addresses and multiple ports to address different nodes within the firewall. But, where two or more nodes share the same IP address, the nodes must know which connections to handle and which are being handled by other nodes in the cluster.

The firewall cluster therefore uses a distribution scheme for port numbers among the cluster nodes, such that each node knows whether traffic is to be handled by other nodes or is to be handled within the cluster node based on the port numbering scheme.

Figure 3:
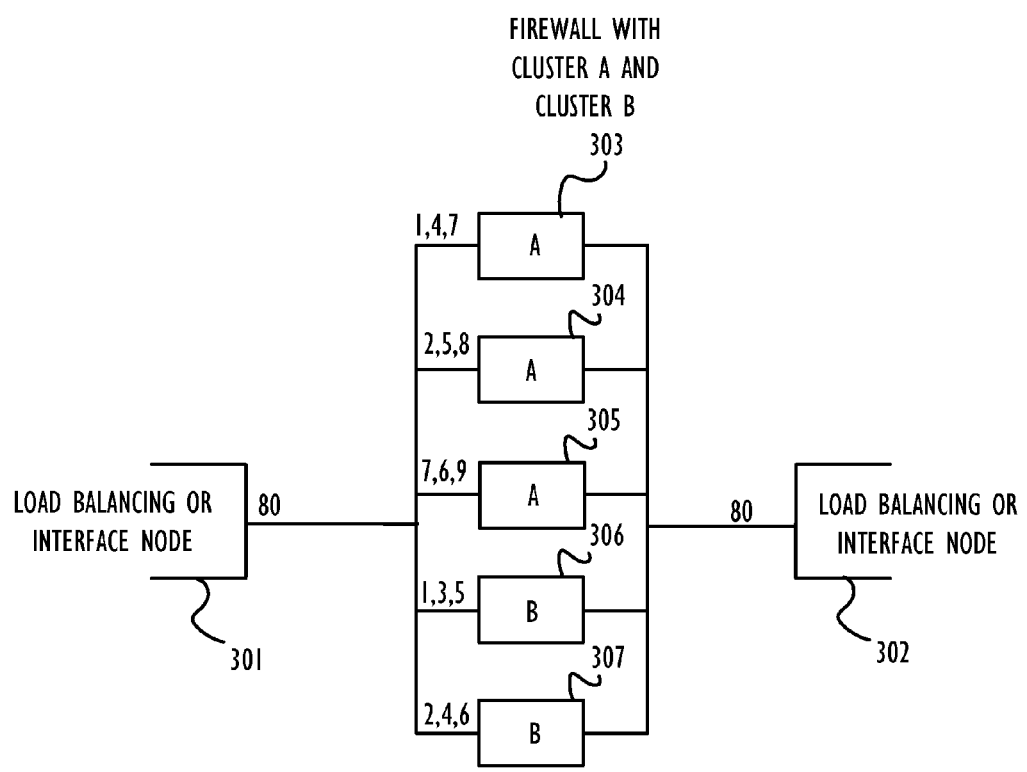
FIG. 3 shows an example network including a distributed firewall and a distributed intrusion protection system employing round-robin port numbering, consistent with an example embodiment of the invention.

Assignment of ports therefore occurs in a predictable way among the nodes within a cluster in some embodiments, such as by using around-robin port numbering approach among nodes having the same IP address within the firewall cluster. FIG. 3 shows an example of round-robin port allocation among firewall cluster node sharing the same IP address, consistent with an example embodiment of the invention. Here, nodes 303-305 are a part of cluster A, and execute a firewall application distributed between the three nodes. Nodes B run another program, such as an email spam filtering application, an intrusion protection system, or other such service.

Communication between load balancing node 301 and the nodes 303-305 is coordinated by assigning each of the nodes to a group of port addresses in a round-robin manner. In a further example, traffic between load balancing or interface node 302 is also coordinated by assigning each of the nodes to a group of port addresses known by both the firewall nodes and the node 302. In some examples, the load balancing or interface nodes 301 and 302 need to be able to assign traffic to certain nodes from among the firewall processing nodes 303-305 to perform load balancing between the nodes, and so can use port numbers distributed among the nodes in a known way as is illustrated here to perform load balancing by routing traffic to a specific node in the firewall cluster.

Here, traffic leaving load balancing node 301 on port 80 with a destination IP address shared by nodes 303, 304, and 305 and a destination port can therefore be recognized and processed by only the desired firewall cluster node based on the known port assignment scheme among firewall nodes.

In the example of FIG. 3, the nodes 303, 304, and 305 are assigned ports in a round-robin manner, such that 303 has ports 1, 4, 7, etc., node 304 has ports 2, 5, 8, etc., and node 305 has ports 3, 6, 9, etc. In this round-robin port assignment scheme, any network traffic directed to the firewall cluster using a port number that is a multiple of three will be handled by node 305, and nodes 304 and 303 will simply ignore the network traffic. Similarly, traffic directed to a port that is a multiple of three minus two will be handled by node 303 and disregarded by nodes 304 and 305, and traffic that is directed to a port that is a multiple of three minus one will be handled by node 304 and disregarded by nodes 303 and 305.

A similar round-robin scheme is used for the "B" nodes 306 and 307 which share a different IP address than the IP address shared by nodes 303-305. Here, there are only two ports sharing the second IP address, so ports are numbered alternating between the two nodes.

Figure 4:
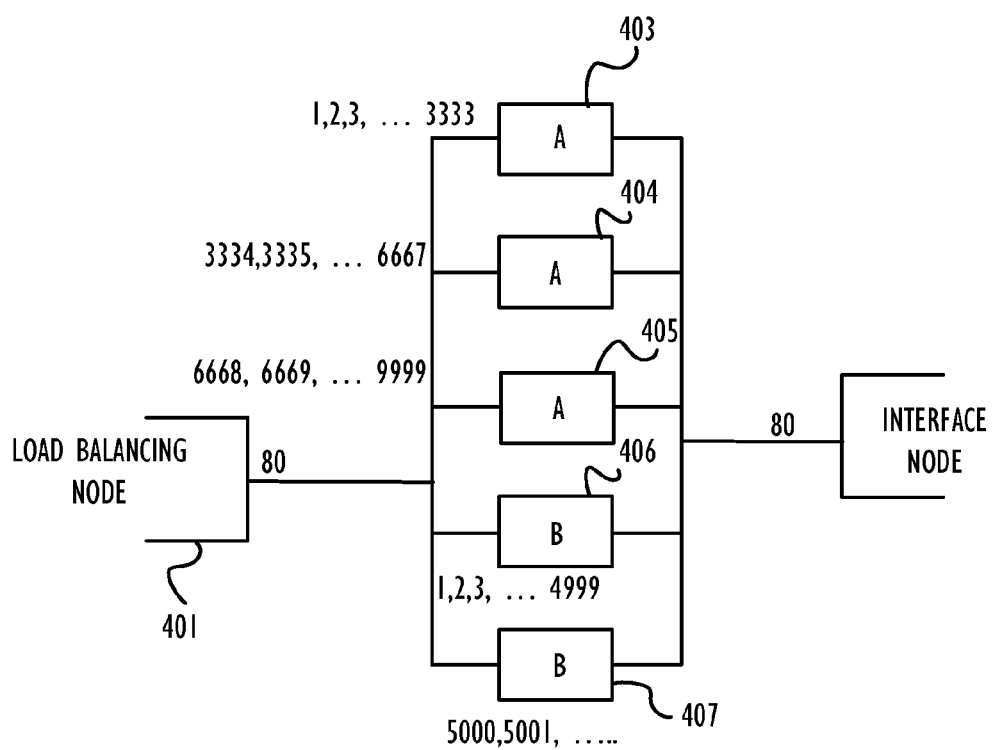
FIG. 4 shows an example network including a distributed firewall and a distributed intrusion protection system employing sequential grouped port numbering, consistent with an example embodiment of the invention.

In another example, port numbers are split up in another predictable way, such as sequential grouping of port numbers by assigning the first third of port numbers in numerical order to the first of three firewall nodes, assigning the second third of port numbers to the second node, and the last third of port numbers to the third node. FIG. 4 shows an example of sequentially grouped port allocation among firewall cluster node sharing the same IP address, consistent with an example embodiment of the invention.

Here, load balancing node 401 directs firewall traffic to distributed firewall processing nodes 403-405, and intrusion protection, antivirus, or other traffic to nodes 406-407. The firewall processing nodes 403-405 share an IP address, but have ports assigned in a grouped manner as shown in FIG. 4. More specifically, because there are three firewall processing nodes, the 9999 available ports are divided into three approximately equal and contiguous groups, which are assigned in order to the three processing nodes. Firewall node 403 therefore receives and processes all traffic on ports 1-3333, while firewall node 404 processes traffic on ports 3334-6667 and firewall node 405 processes traffic on ports 6668-9999.

In a further example, numbers of ports not divisible by the number of nodes result in an additional port being assigned to the lowest number ports, such that the lower numbered ports will have one more port assigned than the highest numbered ports.

Unique assignment of port numbers ensures that certain problems regarding port allocation do not arise, such as if nodes 403 and 404 were to create a connection at the same time and choose the same port numbers. By pre-assigning unique ranges of port numbers to each node in the cluster, port conflict between nodes is avoided. Further, if a load balancer loses or clears its connection tables such as by restarting, the load balancer can send a connection to a port to which the connection was not previously assigned (i.e. the wrong node), and the newly chosen node will automatically handle the connection as a result of the connection being assigned to one of its unique ports. The new node can in a further embodiment use connection state data shared between cluster nodes to further improve processing or handling reassigned connections.

These examples illustrate how port numbering for nodes sharing an address in a firewall cluster can be assigned in a round-robin fashion between nodes sharing the same IP address, including environments where multiple clusters of nodes sharing different IP addresses are present in the system. Each of these clusters can benefit from using a predetermined port distribution scheme such as round-robin port allocation, enabling each node in a shared IP address cluster to handle only that traffic on an assigned port number.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein, it is intended that this invention be limited only by the claims, and the full scope of equivalents thereof.

The invention claimed is:

1. A method of operating a firewall cluster, comprising:
establishing a network connection to transfer data in a firewall cluster having three or more firewall processing nodes sharing a common Internet Protocol (IP) address:
assigning the network connection to one of the three or more firewall processing nodes in the firewall cluster by sending the data to a destination port on the common IP address of the firewall cluster assigned to a receiving node of the three or more firewall processing nodes;
receiving in the receiving node data from the assigned network connection and processing the received data from the assigned network connection based on matching the assigned network connection's destination port number to a port number assigned to the receiving node; and
discarding data from the assigned network connection in the three or more firewall processing nodes other than the receiving node based on the assigned network connection's destination port number not matching a port number assigned to the three or more firewall processing nodes other than the receiving node.

2. The method of operating a firewall cluster of claim 1, wherein the destination ports are assigned to the three or more firewall processing nodes in the firewall cluster sharing the common IP address by round-robin assignment of port numbers to the three or more firewall processing nodes.

3. The method of operating a firewall cluster of claim 1, wherein the destination ports are assigned to the three or more firewall processing nodes in the firewall cluster sharing the common IP address by sequential grouped assignment of port numbers to the three or more firewall processing nodes.

4. The method of operating a firewall cluster of claim 1, further comprising reassigning port numbers to perform at least one of failed node management and load balancing.

5. The method of operating a firewall cluster of claim 1, further comprising replacing a failed firewall processing node by assigning a new node to the replaced node's previously assigned port numbers to manage the failed firewall processing node.

6. The method of operating a firewall cluster of claim 1, further comprising operating at least one input traffic module operable to direct traffic to a selected one of the three or more firewall processing nodes or output traffic module operable to route filtered traffic from the three or more firewall processing nodes.

7. The method of operating a firewall cluster of claim 1, further comprising operating an intrusion protection system in a plurality of intrusion protection processing nodes each sharing a common IP address, and distributing traffic among the plurality of intrusion protection processing nodes by distributing port numbers for the common IP address among the intrusion protection processing nodes.

8. A distributed firewall cluster, comprising:
three or more firewall processing nodes sharing a common Internet Protocol (IP) address;
a non-transitory computer readable storage medium storing instructions that when executed by a processor provide a routing module, the routing module operable to assign a network connection to one of three or more firewall processing nodes in the firewall cluster by sending data from the network connection to a destination port on the common IP address of the firewall cluster assigned to a receiving node of the three or more firewall processing nodes;

wherein an assigned one of the three or more firewall processing nodes is operable to receive data from the network connection and process the received data based on matching the assigned network connection's destination port number to a port number assigned to the one of the three or more firewall processing nodes; and wherein each node of the three or more firewall processing nodes not assigned to receive the network connection are operable to discard the data from the assigned network connection based on the assigned network connection's destination port number not matching a port number assigned to the each node.

9. The distributed firewall cluster of claim 8, wherein the destination port is assigned to one of the three or more nodes in the firewall cluster by round-robin assignment of port numbers to the three or more firewall processing nodes.

10. The distributed firewall cluster of claim 8, wherein the destination port is assigned to one of the three or more nodes in the firewall cluster by sequential grouped assignment of port numbers to the three or more firewall processing nodes.

11. The distributed firewall cluster of claim 8, wherein the routing module is further operable to reassign port numbers to perform at least one of failed node management and load balancing.

12. The distributed firewall cluster of claim 8, wherein the routing module is further operable to replace a failed firewall processing node by assigning a new node to the replaced node's previously assigned port numbers to manage the failed firewall processing node.

13. The distributed firewall cluster of claim 8, further comprising instructions stored on the non-transitory computer readable storage medium that when executed by the processor provide at least one input traffic module, the at least one input traffic module operable to direct traffic to a selected one of the three or more firewall processing nodes or instructions stored on the non-transitory computer readable storage medium that when executed by the processor provide one output traffic module operable to route filtered traffic from the three or more firewall processing nodes.

14. The distributed firewall cluster of claim 8, further comprising an intrusion protection system comprising a plurality of intrusion protection processing nodes each sharing a common IP address, wherein the routing module is further operable to distribute network traffic among the plurality of intrusion protection processing nodes by distributing port numbers for the common IP address among the intrusion protection processing nodes.

15. A non-transitory machine-readable storage device with instructions stored thereon, the instructions when executed operable to cause a computerized system to:

establish a network connection in a connection in a firewall cluster having three or more firewall processing nodes sharing a common Internet Protocol (IP) address;

assign the network connection to one of the three or more firewall processing nodes in the firewall cluster by sending data from the assigned network connection to a destination port on the common IP address of the firewall cluster assigned to a receiving node of the three or more firewall processing nodes;

receive in the receiving node the data from the assigned network connection and processing the received data from the assigned network connection based on matching the assigned network connection's destination port number to a port number assigned to the receiving node; and discard the data from the assigned network connection in the three or more firewall processing nodes other than the receiving node based on the assigned network connection's destination port number not matching a port number assigned to the three or more firewall processing nodes other than the receiving node.

16. The non-transitory machine-readable storage device of claim 15, wherein the destination ports are assigned to the three or more nodes in the firewall cluster sharing the common IP address by round-robin assignment of port numbers to the three or more firewall processing nodes.

17. The non-transitory machine-readable storage device of claim 15, wherein the destination ports are assigned to the three or more nodes in the firewall cluster sharing the common IP address by sequential grouped assignment of port numbers to the three or more firewall processing nodes.

18. The non-transitory machine-readable storage device of claim 16, the instructions when executed further operable to reassign port numbers from the round-robin assignment of port numbers to perform at least one of failed node management and load balancing.

19. The non-transitory machine-readable storage device of claim 15, the instructions when executed further operable to replace a failed firewall processing node by assigning a new node to the replaced node's previously assigned port numbers to manage the failed firewall processing node.

20. The non-transitory machine-readable storage device of claim 15, the instructions when executed further operable to provide at least one input traffic module operable to direct traffic to a selected one of the three or more firewall processing nodes or output traffic module operable to route filtered traffic from the three or more firewall processing nodes.

21. The non-transitory machine-readable storage device of claim 15, the instructions when executed further operable to provide an intrusion protection system in a plurality of intrusion protection processing nodes sharing a common IP address, and distributing traffic among the plurality of intrusion protection processing nodes by distributing port numbers for the common IP address among the intrusion protection processing nodes.

22. A method of operating a distributed firewall device, comprising:

filtering network data in three or more distributed firewall processing nodes, each of the distributed firewall processing nodes sharing a common Internet Protocol (IP) address;

receiving, in a receiving node, data from at least one assigned network connection and processing the received data from the at least one assigned network connection based on matching the assigned network connection's destination port number to a port number assigned to the receiving node; and discarding data from the at least one assigned network connect in the three or more processing nodes other than the receiving node and process only that network traffic assigned to a port number uniquely assigned to the distributed firewall processing node.

23. A method of operating a distributed firewall, comprising:

distributing network connections to three or more distributed firewall processing nodes sharing a common Internet Protocol (IP) address by sending data from each network connection to a port number uniquely assigned to one of the three or more distributed firewall processing nodes;

receiving data after distribution and processing the received data based on matching a destination port number to a port number assigned uniquely to a receiving node; and discarding the data in the three or more distributed firewall processing nodes other than the receiving node based on the destination port number not matching a port number assigned to the three or more distributed firewall processing nodes other than the receiving node.

24. A distributed firewall cluster device, comprising:

a plurality of hardware processing nodes configured to process network traffic, wherein the plurality of hardware processing nodes are configured to:

receive, in a first of the plurality of hardware processing nodes configured as a receiving node of the distributed firewall cluster, at least one assigned network connection and process the at least one assigned network connection based on matching the at least one assigned network connection's destination port number to a port number assigned to the receiving node, wherein the distributed firewall cluster comprises three or more distributed firewall processing nodes, each of the distributed firewall processing nodes sharing a common Internet Protocol (IP) address and configured to process only that network traffic assigned to a port number uniquely assigned to the corresponding distributed firewall processing node; and discard the at least one assigned network connection in the three or more distributed firewall processing nodes other than the receiving node and process only that network traffic assigned to a port number uniquely assigned to the corresponding distributed firewall processing node.

25. A distributed firewall device, comprising:

a plurality of hardware processing nodes configured to process network traffic, wherein at least one of the plurality of hardware processing nodes is configured as a router node and at least one of the hardware processing nodes is configured as a receiving node;

the router node configured to distribute network connections to three or more distributed firewall processing nodes sharing a common Internet Protocol (IP) address by sending each network connection to a port number uniquely assigned to one of the three or more distributed firewall processing nodes;

the receiving node configured to receive data after distribution and process the received data based on matching the destination port number to a port number assigned uniquely to the node configured to receive; and two or more nodes configured to discard the received data based on the destination port number not matching a port number assigned to the two or more nodes, the two or more nodes being different than the receiving node.

\* \* \* \* \*